United States Patent
Bezemer

(10) Patent No.: US 12,004,541 B2
(45) Date of Patent: Jun. 11, 2024

(54) METHOD FOR MAKING CRISPY POTATO FOODSTUFF

(71) Applicant: FOOD COMPOUNDS BV, Oosterhout (NL)

(72) Inventor: Karel Johannes Bezemer, Oosterhout (NL)

(73) Assignee: Food Compounds BV, Oosterhout (NL)

( * ) Notice: Subject to any disclaimer, the term of this patent is extended or adjusted under 35 U.S.C. 154(b) by 727 days.

(21) Appl. No.: 15/558,621

(22) PCT Filed: Mar. 23, 2015

(86) PCT No.: PCT/EP2015/056065
§ 371 (c)(1),
(2) Date: Sep. 15, 2017

(87) PCT Pub. No.: WO2016/150476
PCT Pub. Date: Sep. 29, 2016

(65) Prior Publication Data
US 2018/0077957 A1 Mar. 22, 2018

(51) Int. Cl.
*A23L 5/10* (2016.01)
*A21D 6/00* (2006.01)
*A21D 13/22* (2017.01)
*A21D 13/60* (2017.01)
*A23L 5/30* (2016.01)
*A23L 7/157* (2016.01)
*A23L 13/00* (2016.01)
*A23L 13/50* (2016.01)
*A23L 19/18* (2016.01)
*A23P 20/10* (2016.01)
*A23P 20/12* (2016.01)

(52) U.S. Cl.
CPC .............. *A23L 19/18* (2016.08); *A21D 6/001* (2013.01); *A21D 13/22* (2017.01); *A21D 13/60* (2017.01); *A23L 5/10* (2016.08); *A23L 5/13* (2016.08); *A23L 5/34* (2016.08); *A23L 7/157* (2016.08); *A23L 13/03* (2016.08); *A23L 13/57* (2016.08); *A23P 20/105* (2016.08); *A23P 20/12* (2016.08); *A23V 2002/00* (2013.01)

(58) Field of Classification Search
USPC ................................................... 426/96, 305
See application file for complete search history.

(56) References Cited

U.S. PATENT DOCUMENTS

| | | |
|---|---|---|
| 4,208,442 A | 6/1980 | Evans et al. |
| 5,431,944 A | 7/1995 | Melvej |
| 7,998,512 B1 | 8/2011 | Stevens |
| 2002/0001643 A1* | 1/2002 | Stevens ................... A23L 19/18 426/96 |
| 2009/0098255 A1* | 4/2009 | Stevens ................ A23G 3/0063 426/94 |
| 2009/0258123 A1 | 10/2009 | Gallina |
| 2011/0129563 A1* | 6/2011 | Ashokan .................. A23G 3/50 426/5 |
| 2012/0288598 A1* | 11/2012 | Leusner ................... A23P 20/12 426/291 |
| 2013/0071524 A1* | 3/2013 | Barrett ..................... A23L 7/122 426/96 |
| 2013/0202772 A1 | 8/2013 | Yoshioka et al. |

FOREIGN PATENT DOCUMENTS

| | | |
|---|---|---|
| GB | 1367566 A | 9/1974 |
| WO | WO90/01881 A1 | 3/1990 |
| WO | WO2013/039049 A1 | 3/2015 |

OTHER PUBLICATIONS

International Preliminary Report on Patentability dated Sep. 29, 2016; (PCT/EP2015/056065); 8 pages.
The Engineering Toolbox; US commercial sieve sizes and mesh designations; 6 pages; retrieved from the internet (https://www.engineeringtoolbox.com/sieve-numbers-openings-d_1645.html); on Jun. 14, 2019.

* cited by examiner

*Primary Examiner* — Lien T Tran
(74) *Attorney, Agent, or Firm* — Shay Glenn LLP

(57) ABSTRACT

The present invention relates to methods for processing foodstuff wherein, after exposure of said processed foodstuff to microwaves, a crispy, crunchy or crusty foodstuff is obtained. The present invention further relates to granulates which can be used in the present methods and crispy, crunchy or crusty foodstuff obtainable by the present methods. Specifically, the present invention relates to methods for processing foodstuff comprising the steps of a) providing a foodstuff; b) coating the foodstuff with a dry powder or granulate being comprised of 5 wt % to 50 wt % dextrin; c) exposing the granulate coated foodstuff to water, or water vapour during 0.1 to 10 seconds; and d) baking, frying or boiling the water, or water vapour, exposed foodstuff.

5 Claims, No Drawings

METHOD FOR MAKING CRISPY POTATO FOODSTUFF

The present invention relates to methods for processing foodstuff wherein, after exposure of said processed foodstuff to heat such in microwaves or ovens, a crispy, crunchy or crusty foodstuff is obtained. The present invention further relates to granulates which can be used in the present methods and crispy, crunchy or crusty foodstuff obtainable by the present methods.

During heating of foodstuff in a (microwave) oven, radio waves penetrate the foodstuff and excite water and fat molecules evenly throughout the foodstuff. This even heating of foodstuff, in contrast to conventional heating techniques such as baking, frying or cooking wherein heat migrates from the exterior of a foodstuff to the interior, results in that the surface of microwave prepared foodstuff is not sufficiently heated to form a crispy, crunchy or crusty outer layer or crust. The formation of a crispy, crunchy or crusty outer layer or crust, of microwave prepared foodstuff is also hampered because the surrounding air in a microwave oven is around room temperature.

Because many consumers prefer foodstuff with a crispy, crunchy or crusty outer layer or crust, the application of microwave ovens for preparation of foodstuffs is limited. Examples of foodstuff for which microwave preparation is less preferred are potatoes or potato based products such as fries or chips and meat of meat based products such as hamburgers, minced meat hot dogs or croquettes.

In the art, several approaches have been suggested to solve the above problem of no crust formation. For example, little sleeve made out of foil and cardboard can be inserted in a foodstuff. These sleeves react to microwave energy thereby becoming very hot and providing a crispy crust. The foodstuff can also be packaged in special containers or bags to provide a similar effect.

Despite the above, there is a continuing need in the art for alternative solutions for the absence of a crispy crust formation when foodstuffs are prepared in a microwave.

It is a goal of the present invention, amongst other goals, to address the above need in the art.

This goal of the present invention, amongst other goals, is, according to a first aspect, met by the present invention through a method as defined in the appended claims.

Specifically, this goal of the present invention, amongst other goals, is met by the present invention through methods for processing foodstuff, the present methods comprise the steps of:
a) providing a foodstuff;
b) coating said foodstuff with a dry powder or granulate, preferably a granulate with an average diameter, or size, of 0.1 to 5 mm, and being comprised of 5 wt % to 50 wt % dextrin;
c) exposing the coated foodstuff to water, or water vapour, during 0.1 to 10 seconds; and
d) baking, frying or boiling the water, or water vapour, exposed foodstuff.

Without wishing to be limited to any theory, it is believed that the present methods provide the outer surface of foodstuff with a thin layer having insulating characteristics. Upon microwave heating of the processed foodstuff, the temperature between the insulating surrounding layer and the outer surface of the foodstuff is sufficiently increased for a crust to be formed thereby providing a crispy, crunchy or crusty foodstuff.

Dextrin is generally know in the art and refers to a group of colourless and odourless low-molecular-weight carbohydrates. Dextrin is comprised of polymers of D-glucose units linked by $\alpha$-(1→4) or $\alpha$-(1→6) glycosidic bonds denoted by the general molecule formula $(C_6H_{10}O_5)_n$. Dextrin can be produced by hydrolysis, for example using enzymes like amylases or by applying dry heat under acidic conditions, of starch or glycogen.

Dextrin is generally used in the food industry as a binder. Other uses include the use as a stiffening agent in the textile industry, as an adhesive in glues and as a binding agent in the pharmaceutical industry.

According to a preferred embodiment of the present invention, the dextrin is maltodextrin being a short chain starch sugar produced through enzymatic hydrolysis of gelatin rich starch.

According to the present invention, the present granules are comprised of 5 wt % to 50 wt % (weight percentages are indicated as compared to the total weight of the granulate) dextrin such as 10 wt %, 15 wt %, 20 wt %, 25 wt %, 30 wt %, 35 wt %, 40 wt %, or 45 wt % the remainder weight percentage of the granules being formed by one or more food grade acceptable fillers such as starch and/or flour.

According to the present invention, the present granules have average diameter, or size, of 0.1 to 5 mm such as 0.2 mm, 0.3 mm, 0.4 mm, 0.5 mm, 0.6 mm, 0.7 mm, 0.8 mm, 0.9 mm, 1 mm, 1.5 mm, 2 mm, 2.5 mm, 3 mm, 3.5 mm, 4 mm or 4.5 mm.

According to a preferred embodiment of the present method, the present foodstuff is selected from the group consisting of potato, potato derived products, meat, fruit, processed meat, comminuted meat, vegetable, pastry, dough and combinations thereof.

According to another preferred embodiment of the present method, the foodstuff is provided with a hydrophobic pre-coat before being coated with the present granulate. The hydrophobic pre-coat aids in the adhesion of the present granulate to the foodstuff and, especially in case of foodstuff with a high water content such as potato, at least partially maintains the integrity of the granulate such as by preventing partial dissolution of the granulate upon contact with the foodstuff. A suitable example of a hydrophobic food grade pre-coat is starch.

According to another preferred embodiment of the present method, foodstuff is a frozen foodstuff subjected to a pre-treatment in a hot water bath.

According to an especially preferred embodiment of this first aspect of the present invention, the granulate coated foodstuff is contacted, during 0.1 to 10 seconds with steam. Using steam allows an even and controllable contact of the foodstuff with water.

Considering that a foodstuff processed according the present invention is provided with a crispy crust upon preparation in micro wave oven, the present invention, according to a second aspect, relates to processed foodstuff obtainable by the present methods and, according to a third aspect, to a method for providing crispy foodstuff wherein the method comprises preparing the present processed foodstuff in a microwave oven.

The present invention, according to a fourth aspect, also relates to a granulate with an average diameter of 0.1 to 5 mm comprised of 5 wt % to 50 wt % dextrin, flour and starch.

According to a fifth aspect, the present invention relates to the use of dry powder or a granulate as defined above for providing microwave prepared crispy foodstuff.

The present invention will be further detailed in the following example of an especially preferred embodiment of the present invention.

EXAMPLE

Potatoes were washed, peeled and cut into chips. Next, the chips were pre-coated with starch and then coated with a granulate (average diameter of 0.5 mm and comprised of 30 wt % dextrin, flour and starch). Subsequently, the granulate coated chips were contacted with steam during 2.5 seconds and immediately thereafter submerged in frying oil during 3 minutes. The chips obtained were stored at −20° C.

The frozen chips were placed in a microwave oven and heated on a rotating disc at 900 watt during 7 minutes. After 7 minutes, chips with a crispy crust, comparable to fried chips were obtained.

The invention claimed is:

1. Method for processing a potato foodstuff, said method comprises the steps:
    a) providing a potato foodstuff;
    b) coating said potato foodstuff with a dry powder or granulate comprised of 5 wt % to 50 wt % dextrin;
    c) exposing said coated potato foodstuff to steam during 0.1 to 10 seconds; and
    d) baking, frying or boiling said steam exposed potato foodstuff.

2. Method according to claim 1, wherein said granulate has an average diameter of 0.1 to 5 mm.

3. Method according to claim 1, wherein said granulate or dry powder further comprises starch and/or flour.

4. Method according to claim 1, wherein providing a potato foodstuff in step (a) comprises providing said potato foodstuff with a hydrophobic pre-coat.

5. Method according to claim 1, wherein said potato foodstuff is a frozen potato foodstuff subjected to a pretreatment in a hot water bath.

* * * * *